US012075365B2

(12) United States Patent
Svendsen et al.

(10) Patent No.: US 12,075,365 B2
(45) Date of Patent: Aug. 27, 2024

(54) HANDLING OF RADIO LINK FAILURES IN TELECOMMUNICATION SYSTEMS

(71) Applicant: NOKIA TECHNOLOGIES OY, Espoo (FI)

(72) Inventors: Simon Svendsen, Aalborg (DK); Samantha Caporal Del Barrio, Aalborg (DK); Nuno Manuel Kiilerich Pratas, Gistrup (DK); Sari Kaarina Nielsen, Espoo (FI); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 413 days.

(21) Appl. No.: 17/595,178

(22) PCT Filed: May 13, 2019

(86) PCT No.: PCT/EP2019/062147
§ 371 (c)(1),
(2) Date: Nov. 10, 2021

(87) PCT Pub. No.: WO2020/228934
PCT Pub. Date: Nov. 19, 2020

(65) Prior Publication Data
US 2022/0321158 A1 Oct. 6, 2022

(51) Int. Cl.
*H04W 52/28* (2009.01)
*H01Q 1/24* (2006.01)
(Continued)

(52) U.S. Cl.
CPC .......... *H04W 52/283* (2013.01); *H01Q 1/245* (2013.01); *H04B 1/3838* (2013.01);
(Continued)

(58) Field of Classification Search
CPC ............ H04W 52/283; H04W 52/146; H04W 52/241; H04W 52/367; H04W 4/023;
(Continued)

(56) References Cited

U.S. PATENT DOCUMENTS 8,781,437 B2 7/2014 Ngai et al.
9,867,139 B1 * 1/2018 Khasgiwala ......... H04B 17/318
(Continued)

FOREIGN PATENT DOCUMENTS

| CN | 104640187 A | 5/2015 |
| CN | 105359420 A | 2/2016 |
| WO | 98/29968 A2 | 7/1998 |

OTHER PUBLICATIONS

First Examination Report for India Application No. 202147056981, mailed on Jun. 29, 2022, 6 pages.
(Continued)

*Primary Examiner* — Junpeng Chen
(74) *Attorney, Agent, or Firm* — Robert P. Michal, Esq.; Carter, DeLuca & Farrell LLP

(57) ABSTRACT

When a user equipment detects a condition that a distance between the user equipment, which has an established connection with a network entity of a communications network system, and a subject enters a pre-warning region, the user equipment enters a monitoring mode based on at least the detected condition. In the monitoring mode, options of operations to be performed by the user equipment to mitigate degradation of the established connection due to a required power backoff of an antenna of the user equipment are monitored.

7 Claims, 5 Drawing Sheets

(51) Int. Cl.
| | |
|---|---|
| *H04B 1/3827* | (2015.01) |
| *H04B 17/373* | (2015.01) |
| *H04W 4/02* | (2018.01) |
| *H04W 24/04* | (2009.01) |
| *H04W 52/14* | (2009.01) |
| *H04W 52/24* | (2009.01) |
| *H04W 52/36* | (2009.01) |

(52) U.S. Cl.
CPC .......... *H04B 17/373* (2015.01); *H04W 4/023* (2013.01); *H04W 24/04* (2013.01); *H04W 52/146* (2013.01); *H04W 52/241* (2013.01); *H04W 52/367* (2013.01)

(58) Field of Classification Search
CPC ..... H04W 24/04; H04B 17/373; H01Q 1/245; H01Q 1/3838
See application file for complete search history.

(56) References Cited

U.S. PATENT DOCUMENTS

| | | | | |
|---|---|---|---|---|
| 10,484,075 | B1* | 11/2019 | Maheshwari | ........ H04B 7/0608 |
| 2014/0200003 | A1 | 7/2014 | Kodali et al. | |
| 2014/0370929 | A1* | 12/2014 | Khawand | ............. H04B 1/3838 |
| | | | | 455/522 |
| 2017/0290011 | A1 | 10/2017 | Kushnir et al. | |
| 2018/0076844 | A1* | 3/2018 | Park | .................... H04W 52/367 |
| 2018/0278318 | A1* | 9/2018 | Chakraborty | ....... H04W 52/367 |
| 2018/0351237 | A1* | 12/2018 | Muhn | .................... H01Q 21/28 |
| 2019/0356349 | A1* | 11/2019 | Lan | ........................ H04W 52/24 |
| 2020/0107296 | A1* | 4/2020 | Zhang | ................. H04W 52/283 |

OTHER PUBLICATIONS

Office Action for European Application No. 19724420.5, mailed on Apr. 17, 2023, 8 pages.
International Search Report and Written Opinion for International Application No. PCT/EP2019/062147, mailed on Feb. 5, 2020, 13 pages.
3GPP TSG-RAN WG Meeting #88bis, R4-1813169; "FR2 UE RF Exposure Compliance and New UE P-MPR Information to Network", Agenda item: 7.6.7.1.2; Source: Nokia, Nokia Shanghai Bell; Chengdu, China; Oct. 8-12, 2018; 4 pages.
3GPP TSG RAN WG1 Meeting #96bis, R1-1905229; "On FR2 RF Exposure Mitigation Methods", Agenda item: 5; Source: Nokia, Nokia Shanghai Bell; Xi'an, China; Apr. 8-12, 2019; 4 pages.
Balanis, "Antenna Theory Analysis and Design", Wiley-Interscience, 3rd edition, 2005, 1072 pages.
Wu et al., "Safe for Generations to Come: Considerations of Safety for Millimeter Waves in Wireless Communications", IEEE Microwave Magazine, vol. 16, No. 2, Feb. 6, 2015, pp. 65-84.
Alekseev et al., "Millimeter wave power density in aquaeous biological samples", Bioelectromagnetics, vol. 22, No. 4, Apr. 5, 2001, pp. 288-291.
"Radiofrequency radiation exposure evaluation: portable devices", eCFR, Retrieved on Feb. 14, 2024, Webpage available at : https://www.ecfr.gov/current/title-47/chapter-I/subchapter-A/part-2/subpart-J/subject-group-ECFR52efa600149ef42/section-2.1093.
Wu et al., "The Human Body and Millimiter-Wave Wireless Communication Systems: Interactions and Implications", IEEE International Conference on Communications (ICC), Jun. 8-12, 2015, pp. 2423-2429.
"Required P-MPR/UL dutycycle restriction for MPE regulations at FR2", 3GPP TSG-RAN WG4 Meeting #90, R4-1900252, Agenda item: 6.7.4.2, LG Electronics, Feb. 25-Mar. 1, 2019, 5 pages.
"Discussion on FR2 UE MPE remaining issues", 3GPP TSG-RAN WG4 Meeting #90, R4-1900253, Agenda item: 6.7.8, OPPO, Feb. 25-Mar. 1, 4 pages.
"Discussion on the MPE (Maximum Permissible Exposure) issue", 3GPP TSG RAN WG1 Ad-Hoc Meeting 1901, R1-1900296, Agenda Item: 7.2.8.6, OPPO, Jan. 21-25, 2019, 5 pages.
"Way Forward on RF exposure compliance in FR2", 3GPP TSG-RAN WG4 Meeting #88bis, R4-1814176, Agenda Item: 7.6.7.1.2, Intel Corporation ,Oct. 8-12, 2018, pp. 1-4.
"Draft CR on revised configured Tx power for MPE reguratory requirements in TS38. 101-2", 3GPP TSG-RAN WG4 Meeting # 90, R4-1900268, LG Electronics, Feb. 25-Mar. 1, 2019, 3 pages.
"[Draft] LS on FR2 RF Exposure mitigation methods", 3GPP TSG-RAN WG4 Meeting #90, R4-1900451, RAN4, Feb. 25-Mar. 1, 2019, 1 page.
"Draft LS on potential beam management enhancement in maximum permissible exposure scenarios", 3GPP TSG-RAN WG4 Meeting #90, R4-1900217, RAN4, Feb. 25-Mar. 1, 2019, 1 page.
"Uplink duty cycle control as link failure mitigation technique in FR2", 3GPP TSG-RAN WG4 Meeting #89, R4-1815787, Agenda item: 7.6.6.1.2, Intel Corporation, Nov. 8-12, 2018, pp. 1-4.
"Draft LS on UE UL duty cycle handling in maximum permissible exposure scenarios", R4-1900218, RAN4, Feb. 25-Mar. 1, 2019, 2 pages.
"[Draft] LS on FR2 RF Exposure mitigation methods", 3GPP TSG-RAN WG4 Meeting #90, R4-1902193, RAN4, Feb. 25-Mar. 1, 2019, 1 page.
"Moderator summary for multi-beam enhancement: Round 4", 3GPP TSG RAN WG1 #105-e, R1-2106285, Agenda item: 8.1.1, Samsung, May 10-27, 2021, 14 pages.
"Enhancements on Multi-beam Operation", 3GPP TSG RAN WG1 #106-e, R1-2108052, Agenda item: 8.1.1, Nokia, Aug. 16-27, 2021, 30 pages.
"Moderator summary#5 for multi-beam enhancement: Round 4", 3GPP TSG RAN WG1 #106-e, R1-2108557, Agenda item: 8.1.1, Samsung, Aug. 16-27, 2021, 22 pages.
Office Action received for corresponding Chinese Patent Application No. 201980096345.2, dated Feb. 29, 2024, 11 pages of Office Action and English translation 10 pages, total 21 pages.

* cited by examiner

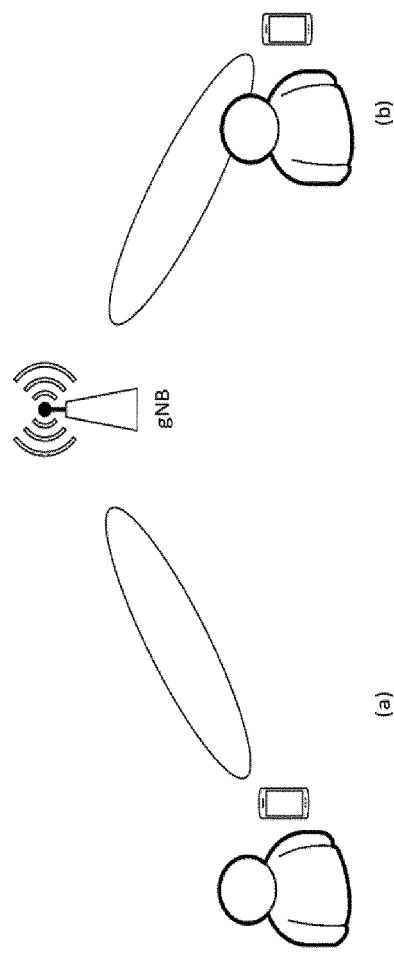
Fig. 1
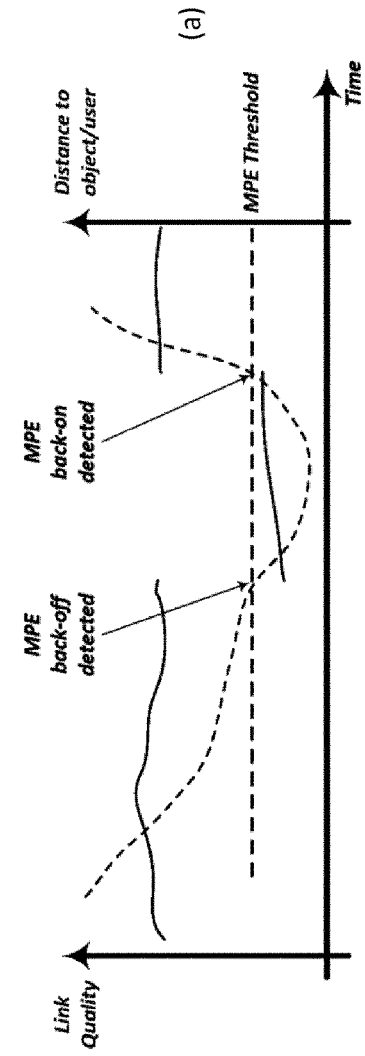
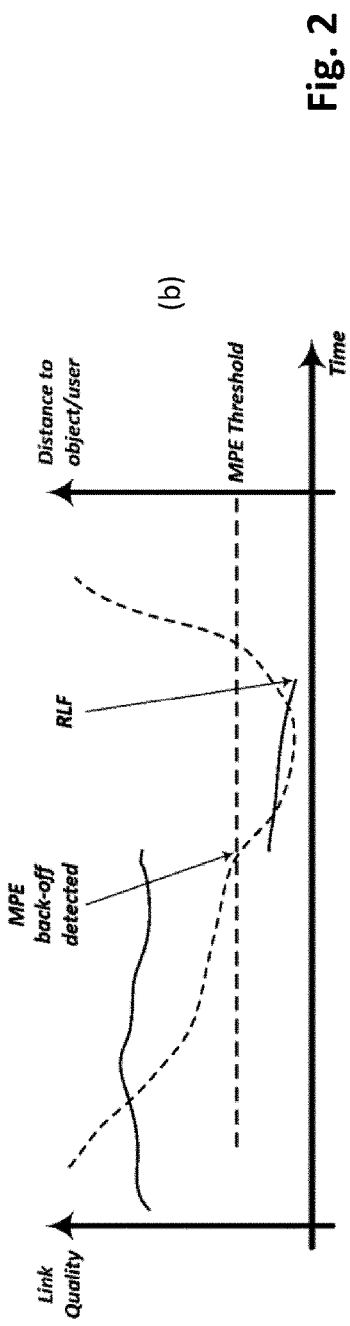
Fig. 2

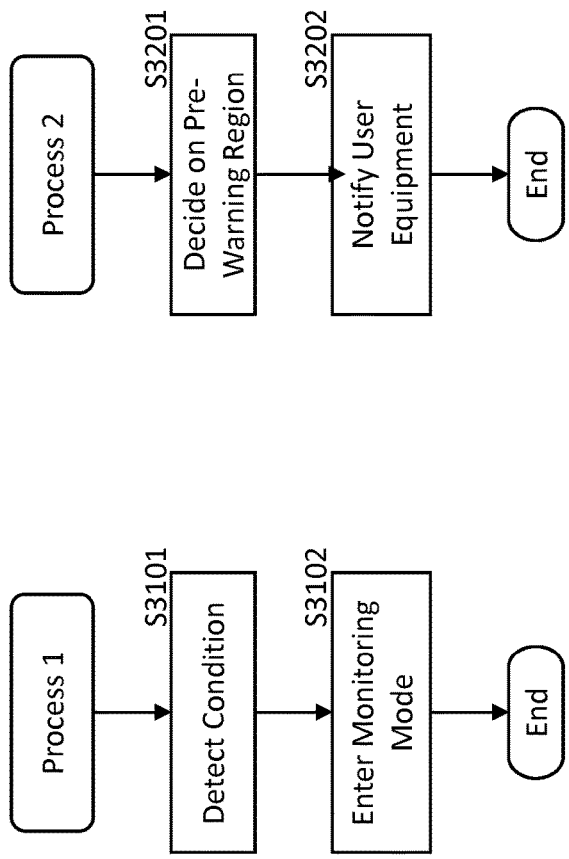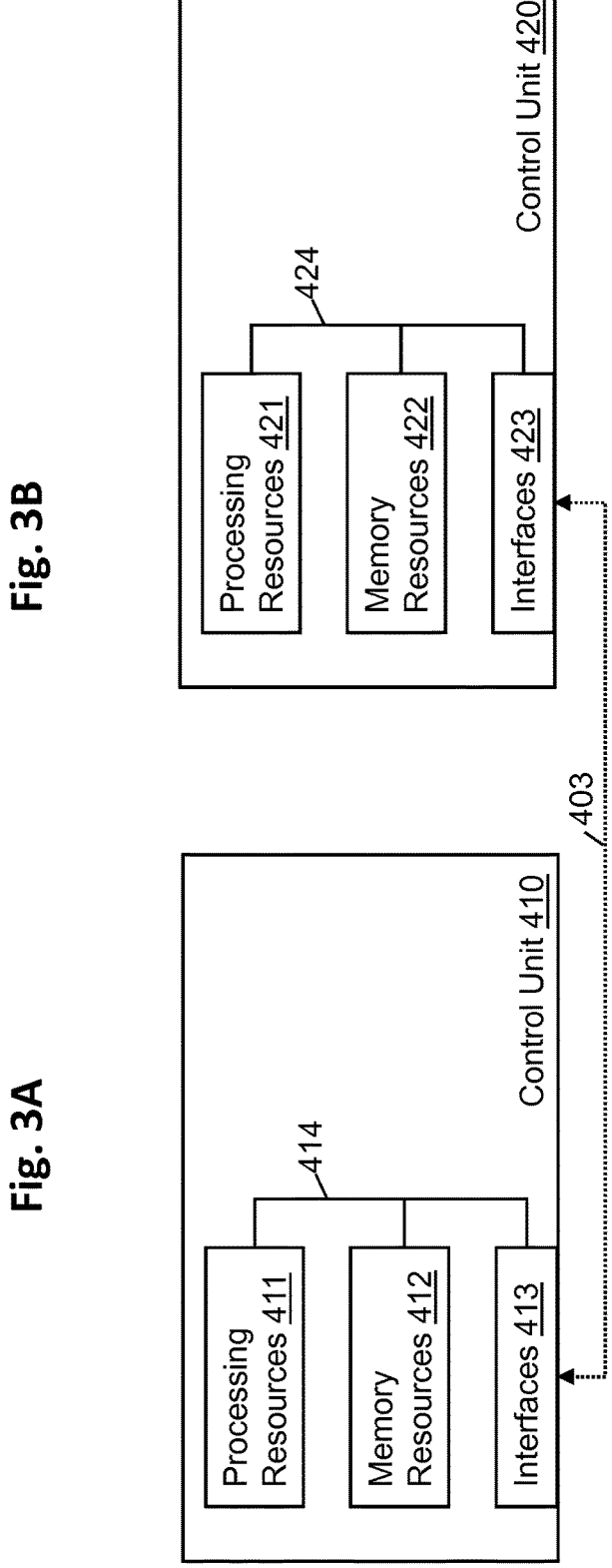

HANDLING OF RADIO LINK FAILURES IN TELECOMMUNICATION SYSTEMS

CROSS-REFERENCE TO RELATED APPLICATIONS

This application is a national stage entry of International Application No. PCT/EP2019/062147, filed May 13, 2019, entitled "HANDLING OF RADIO LINK FAILURES IN TELECOMMUNICATION SYSTEMS" which is hereby incorporated by reference in its entirety.

TECHNICAL FIELD

At least some example embodiments relate to handling of radio link failures in telecommunication systems. For example, at least some example embodiments relate to preventing radio link failures due to maximum permissible exposure power limitations in communications network systems.

LIST OF ABBREVIATIONS 4G 4th Generation
5G 5th Generation
A Antenna effective aperture
ACK/NACK Positive/Negative ACKnowledgement
BS BaseStation
DL DownLink
EIRP Effective Isotropic Radiated Power
FCC Federal Communications Commission
FR1 Frequency Range 1
FR2 Frequency Range 2
FR3 Frequency Range 3
FSPL Free Space Path Loss
gNB gNodeB (next generation Node B, Base station in 5G)
ICNIRP International Commission on non-ionizing Radiation Protection
LOS Line Of Sight
mmW millimeter Wave
MPE Maximum Permissible Exposure
MPEC MPE-Compliance
NR New Radio
PBO Power Backoff
PD Power Density
RLF Radio Link Failure
SAR Specific Absorption Rate
SRS Sounding Reference Signal
TX Transmitter
UCI UL control information
UE User Equipment
UL UpLink

BACKGROUND

As the number of online services dramatically increases every year, the need for bandwidth is huge. The millimeter-wave (mmW) spectrum offers the possibility of using large portions of contiguous bandwidth to address high-throughput applications. The 5th Generation (5G) New Radio (NR) frequency spectrum extends well-above the previous 4th Generation (4G) one, which was ranging from 400 MHz to 6 GHz—otherwise known as Frequency Range 1 (FR1). In mmWave 5G NR, Frequency Range 2 (FR2) comprises the frequencies between 24 GHz and 52 GHz; and extending the NR operation into the 52-114 GHz range is currently being discussed.

Frequencies of 30 GHz and 60 GHz yield a wavelength of 10 mm and 5 mm respectively. Though wavelengths are very short in the mmW spectrum, the received power is not reduced at higher frequencies, if the effective antenna apertures are constant. This can be understood from the following formulas for Free Space Path Loss (FSPL) and Aperture (A):

$$FSPL=(4\pi d/\lambda)^2=(P_t G_t G_r)/P_r \text{ and } A=(G\lambda^2)/4\pi, \text{ where}$$

$P_r$ is the received power,
$P_t$ is the transmitted power,
G is the antenna gain,
$G_t$, $G_r$ are the transmitter and receiver antenna gains,
d is the distance between the transmitter and the receiver,
$\lambda$ is the wavelength.

Consequently, to cover acceptable cell areas and limit the propagation loss, the antenna gain needs to increase with frequency, i.e. the number of antenna elements needs to increase. 5G antennas are expected to provide a gain of around 10 dB at UE and 20 dB at BS.

However, operating at such high frequencies with high gain antennas has raised concerns for the health of the users. Therefore, there is a standard on mmW regime that specifies and regulates the maximum power for the User Equipment (UE). Since frequencies below 100 GHz are non-ionizing, the concern for health is limited to thermal heating of the body tissue while absorbing electromagnetic mmW energy. mmW frequencies yield penetration depths below 1 mm, therefore possible thermal damage is limited to the surface of the skin and the eyes. Most of the energy is absorbed within the first 0.4 mm of the human skin at 42 GHz.

Governmental exposure guidelines are in place to prevent health issues due to thermal effects. Below 6 GHz, Specific Absorption Rate (SAR) has been used to determine the exposure threshold. SAR measures the energy absorbed by the human body when exposed to electromagnetic fields. The SAR limitation in the U.S. is 1.6 W/kg averaged over 1-g tissue from FCC, while in Europe it is 2 W/kg averaged over 10-g tissue. The 1-g averaging provides a finer resolution for the study of energy absorption in the human body.

Nonetheless, at mmW regime where the penetration depth is below 1 mm, even 1-g tissue is in fact a rather large volume. Being difficult to define a meaningful volume for SAR evaluation, it has been commonly accepted to use Power Density (PD) and not SAR to set the restrictions on exposure at mmW frequencies. It is thus a planar energy distribution as opposed to a volumetric one. The Maximum Permissible Exposure (MPE) is the regulation on PD for the mmWave regime. The FCC and ICNIRP set the threshold for MPE at 10 W/m2 (1 mW/cm2), for the general public, between 6 or 10 GHz respectively and 100 GHz. The energy absorbed by the human body increases as a function of the distance to the UE. Therefore, to comply with the MPE limit, the UE might have to reduce its output power if the user gets in close vicinity of the antenna.

UE power backoff to limit exposure will be described next. The UE uplink (UL) takes place in one of the two scenarios (a) and (b) depicted in FIG. 1 illustrating cases (a) and (b):

In case (a), there is an unobstructed (Line of Sight) LOS path from the UE to the gNB.

In case (b), a subject (e.g. a human body, a user) is present on the path of the beam from the UE.

In case (a), the Effective Isotropically Radiated Power (EIRP) peaks at +34 dBm. In case (b), the user is exposed to the radiated beam. As the user comes in close vicinity of the UE, the amount of energy absorbed by the user's body increases; as such the output power of the UE needs to be reduced to comply with the MPE.

For example, for a 2×2 antenna array of the UE, from a distance between the UE (e.g. the antenna/antenna array of the UE) and the user of 14 cm onwards (i.e. distance<=14 cm), the UE needs to reduce its output power to comply with MPE. In this context it is noted that a larger array will require the UE to reduce its power before 14 cm.

Moreover, the peak EIRP drops from 34 dBm to 31 dBm when the user is located at a distance of 10 cm to the UE. It further drops to 8 dBm at 2 mm. Thus, up to a 26 dB drop (for a 2×2 array) can be observed in the transmitted power from the UE in presence of the user nearly touching the antenna.

In summary, some 5G NR bands operate at very high frequencies, thus use high gain antennas to maintain a signal with appropriate signal to noise ratio. However, high gain antennas direct a lot of energy that might come towards the user, whom FCC protects by setting an MPE threshold. The UE must always comply with MPE, and subsequently reduce its output power if the user comes in close vicinity of the UE. The concern is that reducing too much the output power might lead to losing the connection to the base station (gNB), i.e. might result in a Radio Link Failure (RLF).

SUMMARY

At least some example embodiments aim at preventing radio link failures due to maximum permissible exposure power limitations by providing for a warning and monitoring mode.

According to at least some example embodiments, this is achieved by the methods, apparatuses and non-transitory computer-readable storage media as specified by the appended claims.

In the following example embodiments and example implementations will be described with reference to the accompanying drawings.

BRIEF DESCRIPTION OF THE DRAWINGS

FIG. 1 shows a diagram illustrating an uplink scenario.

FIG. 2 shows time charts each illustrating power backoff due to MPE compliance.

FIG. 3A shows a flowchart illustrating a process 1 according to at least some example embodiments.

FIG. 3B shows a flowchart illustrating a process 2 according to at least some example embodiments.

FIG. 4 shows a schematic block diagram illustrating a configuration of control units in which at least some example embodiments are implementable.

DESCRIPTION OF THE EMBODIMENTS

Figure 5:
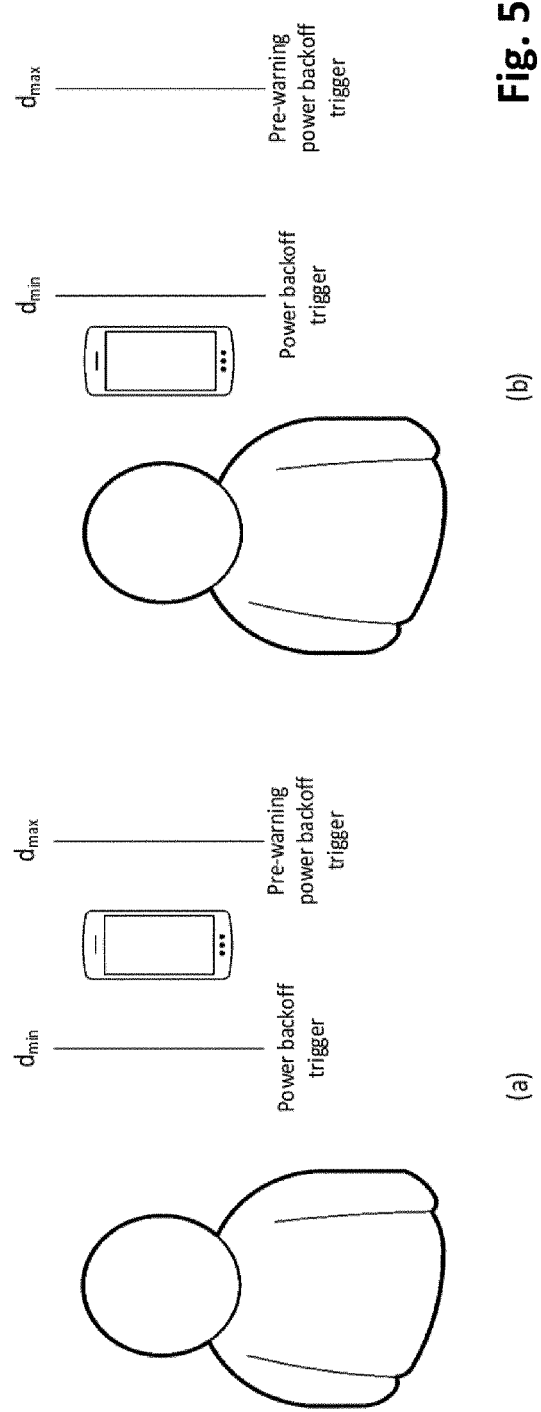
FIG. 5 shows a diagram for illustrating a pre-warning region according to an example embodiment.

As described beforehand, as soon as an MPE compliance mode is triggered (i.e. a UE is detected to be in close proximity of a subject, e.g. a human body, a user), the UE needs to nearly immediately do a Power Back-Off (PBO), as there is no time to check for a better option.

In time charts (a) and (b) of FIG. 2, solid lines indicate a link quality of a connection (e.g. radio link) established between a UE and a network entity of a communications network system (e.g. a gNB) over time, and dotted lines indicate a distance of the UE (e.g. an antenna/antenna array of the UE) to an object/user over time.

In situations (a) and (b) illustrated in FIG. 2, the UE has performed a power backoff due to MPE compliance at a time when the distance to the object/user (also referred to as subject or human body in the following) falls below an MPE threshold. In response thereto, the link quality has dropped.

In situation (a), when the distance exceeds the MPE threshold again, the UE performs an MPE back-on, e.g. increases the output power of its antenna again, and the link quality of the connection established between the UE and the gNB also increases.

However, in situation (b) of FIG. 2, an RLF occurs before the distance exceeds the MPE threshold after the power backoff.

According to FIG. 2, because the PBO can be very large, it is rather likely that an RLF will occur as the gNB is not ready to cope with this extreme drop in the uplink signal.

At least some example embodiments provide for mechanisms that allow the network to cope with PBO due to MPE compliance. Being able to react before the MPE compliance mechanism is triggered has a great impact on the system performance.

According to at least some example embodiments, a sudden drop in UL performance can be avoided.

According to at least some example embodiments, a radio link failure can be limited.

According to at least some example embodiments, DL performance can be maintained.

According to at least some example embodiments, presence of a subject is detected well before the UE must perform a PBO. Dedicated mechanisms built in a device to detect a nearby object including humans, e.g. a proximity sensor, can be implemented in many ways including 60 GHz radars. Based on the proximity sensor, the device will autonomously backoff its TX power to comply with MPE requirements.

FIG. 3A shows a flowchart illustrating a process 1 according to at least some example embodiments. According to an example embodiment, process 1 is executed by a UE.

In step S3101, a condition is detected that a distance between the UE, which has an established connection with a network entity of a communications network system, e.g. a gNB, and a subject, e.g. a user, enters (e.g. falls into) a pre-warning region. The pre-warning region will be described in further detail later on.

In step S3102, a monitoring mode is entered based on at least the detected condition. In the monitoring mode, options of operations to be performed by the UE to mitigate degradation of the established connection due to a required power backoff of an antenna of the UE are monitored. The monitoring mode will be described in further detail later on.

FIG. 3B shows a flowchart illustrating a process 2 according to at least some example embodiments. According to an example embodiment, process 2 is executed by a network entity of a communications network system, e.g. a gNB.

In step S3201, a parameter of a pre-warning region is decided on, wherein, when a distance between a UE and a subject, e.g. a user, enters (e.g. falls into) the pre-warning region, the UE is capable of entering the above-mentioned monitoring mode. The parameter will be described in further detail later on.

In step S3202, the parameter is notified to the user equipment.

As a preliminary matter before exploring details of various example embodiments and implementations, reference is made to FIG. 4 for illustrating a simplified block diagram of various electronic devices that are suitable for use in practicing at least some example embodiments and implementations.

FIG. 4 shows a control unit 410 which comprises processing resources (e.g. processing circuitry) 411, memory resources (e.g. memory circuitry) 412 and interfaces (e.g. interface circuitry) 413, which are coupled via a connection 414. According to an example implementation, the control unit 410 is implemented in a UE.

According to an example implementation, the memory resources 412 store a program that when executed by the processing resources 411 enable the electronic device, e.g. the UE, to operate in accordance with process 1 shown in FIG. 3A.

The interfaces 413 comprise a suitable radio frequency (RF) transceiver (not shown) coupled to one or more antennas (not shown) for bidirectional wireless communications over one or more wireless links 403 with a control unit 420.

The control unit 420 comprises processing resources (e.g. processing circuitry) 421, memory resources (e.g. memory circuitry) 422 and interfaces (e.g. interface circuitry) 423, which are coupled via a connection 424. According to an example implementation, the control unit 420 is implemented in a network entity, e.g. a gNB.

According to an example implementation, the memory resources 422 store a program that when executed by the processing resources 421 enable the electronic device, e.g. the gNB, to operate in accordance with process 2 shown in FIG. 3B.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Further, example embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As mentioned above, a pre-warning region is introduced as depicted in FIG. 5, where the UE enters a state where it starts searching for different options on how to mitigate performance degradation due to power backoff.

The pre-warning region is defined between a distance $d_{min}$ (also referred to as second distance) and a distance $d_{max}$ (also referred to as first distance). The distance $d_{min}$ is the distance to the subject, where the UE must change the link because of MPE regulations. The distance $d_{max}$ is the distance to the subject, where the UE starts monitoring.

In situation (a) shown in FIG. 5, the UE is within the pre-warning region where it is at risk of performing a power backoff. In situation (b) shown in FIG. 5, the UE has performed a PBO.

According to at least some example embodiments, the UE informs the gNB that a user is located in close vicinity of the antenna used for uplink. According to an example implementation, the UE also reports to the gNB different options available instead of a PBO. These messages are sent after the detection of the human body but before a PBO is triggered due to the MPE limit. Thus, the gNB has time to evaluate—with the UE—and rank the different options available in order to maintain the connection, in spite of the presence of the user. In the event of reaching the MPE limit, according to an example implementation, the UE has already been instructed by the gNB on what action to take, depending on its capabilities and on the channel.

According to an example implementation, the UE and the gNB may make a co-decision during the pre-warning region, to avoid a large and sudden PBO, potentially causing an RLF. When/If the user comes too close to the antenna and triggers an MPE compliance action (e.g. a PBO), the UE has already agreed with the gNB on the action to take. This could be better than a PBO, however if there was no better option than a PBO and an RLF should happen, both the UE and the gNB are informed on the reason of the lost connection.

According to an example implementation, making the (co-)decision should happen before the distance between the subject on the LOS path and the UE has become so small that the UE backs the power off. According to an example implementation, the reconfiguration of the link from the UE includes knowledge from the gNB. Usually, the UE alone cannot choose the best option without the channel knowledge that the gNB can provide. According to an example implementation, if an RLF occurs, the gNB is informed in advance for best performance.

According to an example embodiment, to handle a PBO due to MPE compliance, a pre-warning region (monitoring zone) is introduced, e.g. as shown in FIG. 5, and human body detection close to the antenna used for uplink is reported to the gNB by the UE well before the MPE limit.

According to an example implementation, options with gNB and UE are evaluated, on what to do if the user approaches and triggers PBO, e.g. using signaling on UE beam capabilities to the gNB.

According to an example implementation, instructions are sent from gNB to the UE on what will be the best option in such event, e.g. using signaling on reported UE beam capabilities to the UE.

Advantages of a warning message sent from the UE to the gNB when a subject entering the pre-warning region is detected by the UE are that the gNB may find a more suited configuration for the UE than the PBO, and the gNB knows why there is a link imbalance.

According to an example implementation, in the pre-warning region the UE monitors different possibilities in case of a user triggering an MPE-compliance (MPEC) based action. In other words, in the pre-warning region the UE is in a monitoring mode in which options of operations to be performed by the UE to mitigate degradation of the established connection due to a required power backoff of an antenna of the UE are monitored.

Note that this monitoring mode is triggered by a user approaching but not yet requiring a PBO and might not even affect the current radio link. Therefore, the current signal is so good that a monitoring mode would normally not be activated. In this specific scenario, the UE forces a monitoring mode based on the risk associated to a sudden RLF because of an MPE-based PBO. Monitoring is happening while the link is in good conditions, in the pre-warning region, to possibly find a better option than a sudden large PBO of e.g. 26 dB. The pre-warning region is defined between distances $d_{min}$ and $d_{max}$ as shown in FIG. 5, where $d_{min}$ is where the UE must change the link because of MPE regulations and $d_{max}$ is where the UE starts monitoring.

For example, an antenna of 1 cm operating at 60 GHz is assumed. The Far Field of such an antenna is situated from 4 cm onwards (FF=$2D^2$/lambda, D is the distance between the user and the antenna). At a given threshold $d_{min}$ (e.g. 14 cm), the UE must proceed with an MPE-compliance action to protect the user. The location of the user is estimated with proximity sensors. Let us assume $d_{max}=d_{min}$+offset, though the exact values for these thresholds are UE specific. The pre-warning region (monitoring zone) is depicted in FIG. 6, between a pre-warning threshold corresponding to $d_{max}$ and an MPE threshold corresponding to $d_{min}$.

Figure 6:
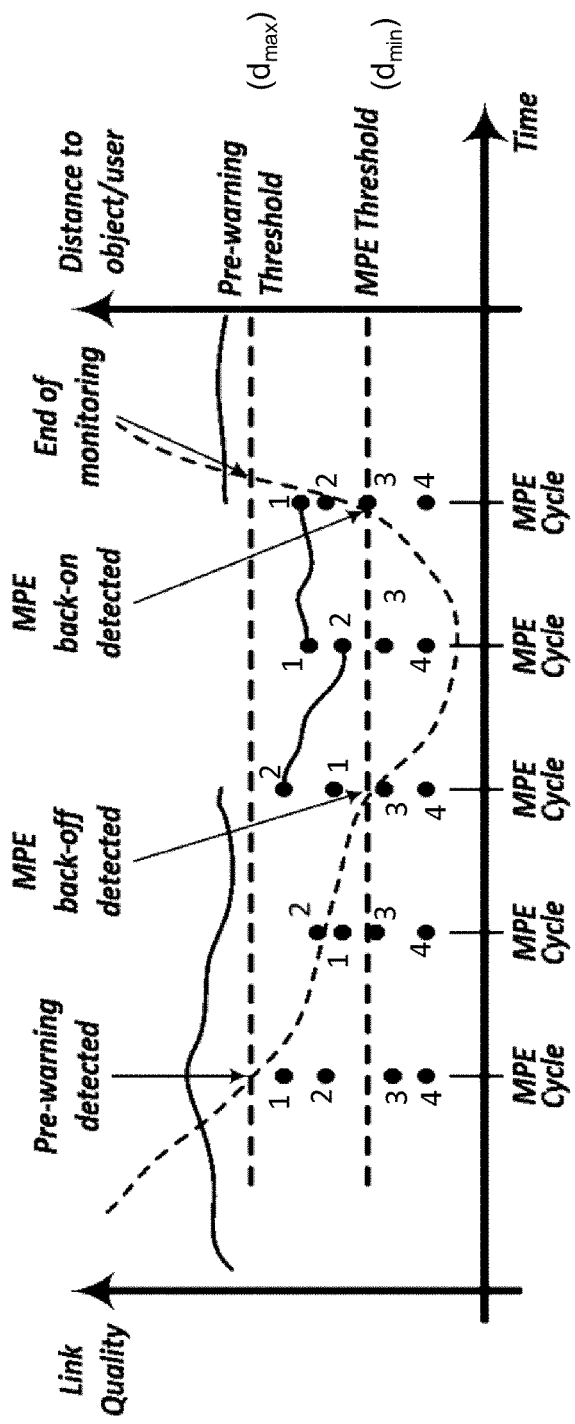
FIG. 6 shows a time chart illustrating a monitoring zone and MPE cycle according to an example implementation.

FIG. 6 shows a time chart, in which solid lines indicate a link quality of a connection (e.g. radio link) established between the UE and a network entity of a communications network system (e.g. a gNB) over time, and a dotted line indicates a distance of the UE (e.g. the antenna of the UE) to the object/user over time.

The UE is responsible for detecting the pre-warning threshold and starting the monitoring mode. According to an example implementation, the UE detects a condition that a distance between the UE and the object/user enters (e.g. falls into) the pre-warning region in case the distance falls below the pre-warning threshold $d_{max}$ (indicated as "Pre-warning detected" in FIG. 6). In other words, the condition comprises that the distance falls below $d_{max}$. According to an example embodiment, the monitoring mode comprises an MPE cycle (also referred to as monitoring cycle) with which at least one of the above-mentioned options of operations are monitored. Such options are shown in FIG. 6 as dots numbered "1", "2", "3" and "4".

According to an example implementation, the distance $d_{max}$–$d_{min}$ should give enough time for the UE to scan its options, report to the gNB and get a decision back. Once the UE reaches $d_{min}$ (indicated as "MPE back-off detected" in FIG. 6), it reconfigures to the best of the options tested in the monitoring zone. According to FIG. 6, these are options #2 and #1. According to an example implementation, the gNB has already ranked the options for the UE, taking the channel into account.

Referring to FIG. 6, when the distance exceeds the MPE threshold again (indicated as "MPE back-on detected" in FIG. 6), the UE performs an MPE back-on, e.g. increases the output power of its antenna again, and the link quality of the connection established between the UE and the gNB also increases. When the distance exceeds the pre-warning threshold (indicated as "End of monitoring" in FIG. 6), the UE ends the monitoring, e.g. returns from the monitoring mode.

Messaging and ranking of the options available at the UE are out of scope of this application. Briefly, the UE can communicate to the gNB which UE beam configuration is used for sending a specific uplink signal. Consequently, the UE and gNB can gather knowledge on UE capabilities and rank the best option to mitigate the link degradation.

Once the UE has detected that the pre-warning threshold has been reached, according to an example embodiment, the UE starts the monitoring directly. The UE may send its current beam configuration to the gNB.

According to another example embodiment, once the UE has detected that the pre-warning threshold has been reached, it informs the gNB that the pre-warning threshold has been reached. The UE may start monitoring by sending its current beam configuration.

According to another example embodiment, once the UE has detected that the pre-warning threshold has been reached, it informs the gNB that the pre-warning threshold has been reached and requests to start the monitoring mode. Alternatively, the gNB can inform in advance of a conditional monitoring mode, via RRC or MAC layer messaging for measurement reporting configuration, that the UE can start monitoring autonomously once the pre-warning threshold is reached.

Figure 7:
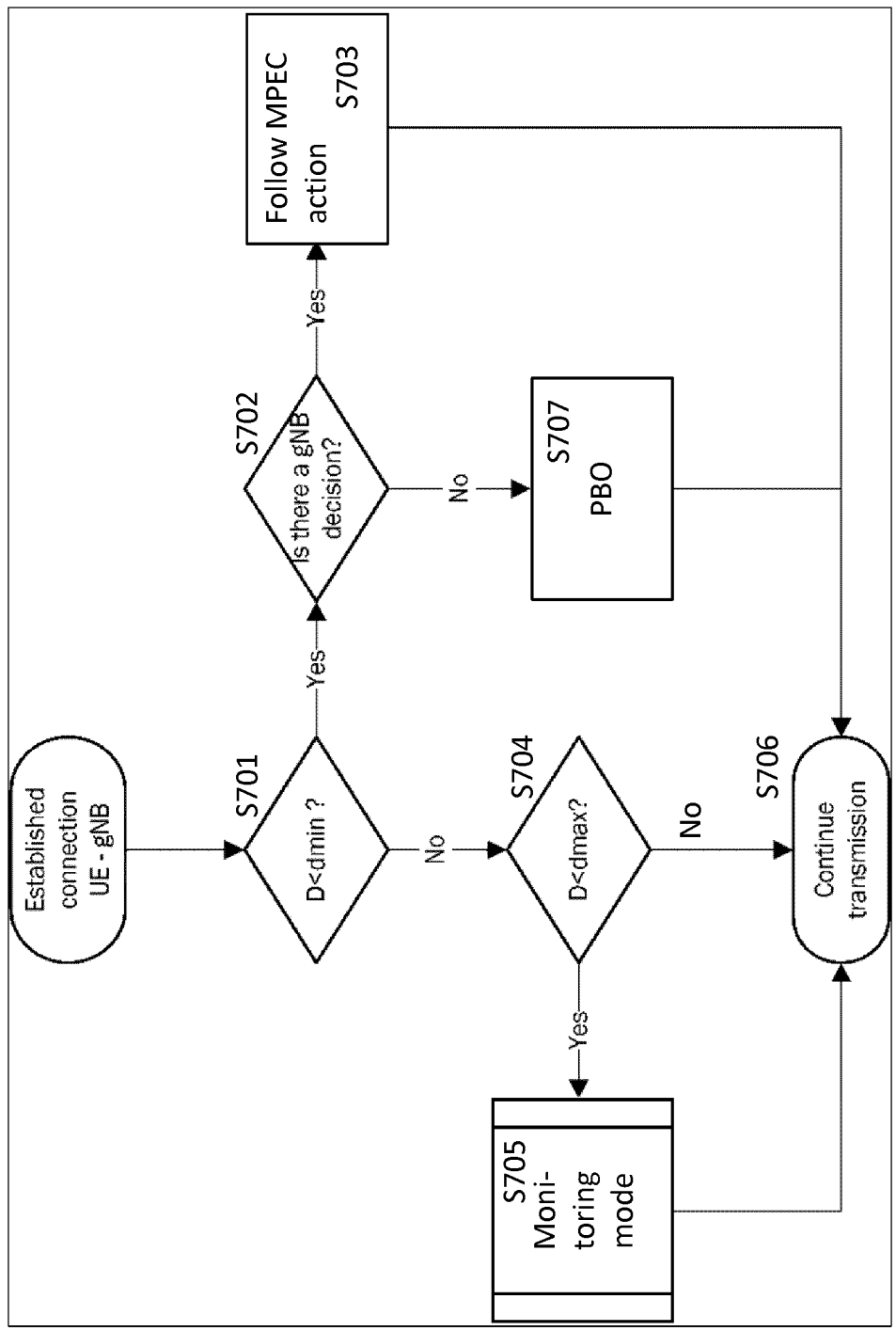
FIG. 7 shows a flowchart illustrating a process according to an example implementation.
Figure 8:
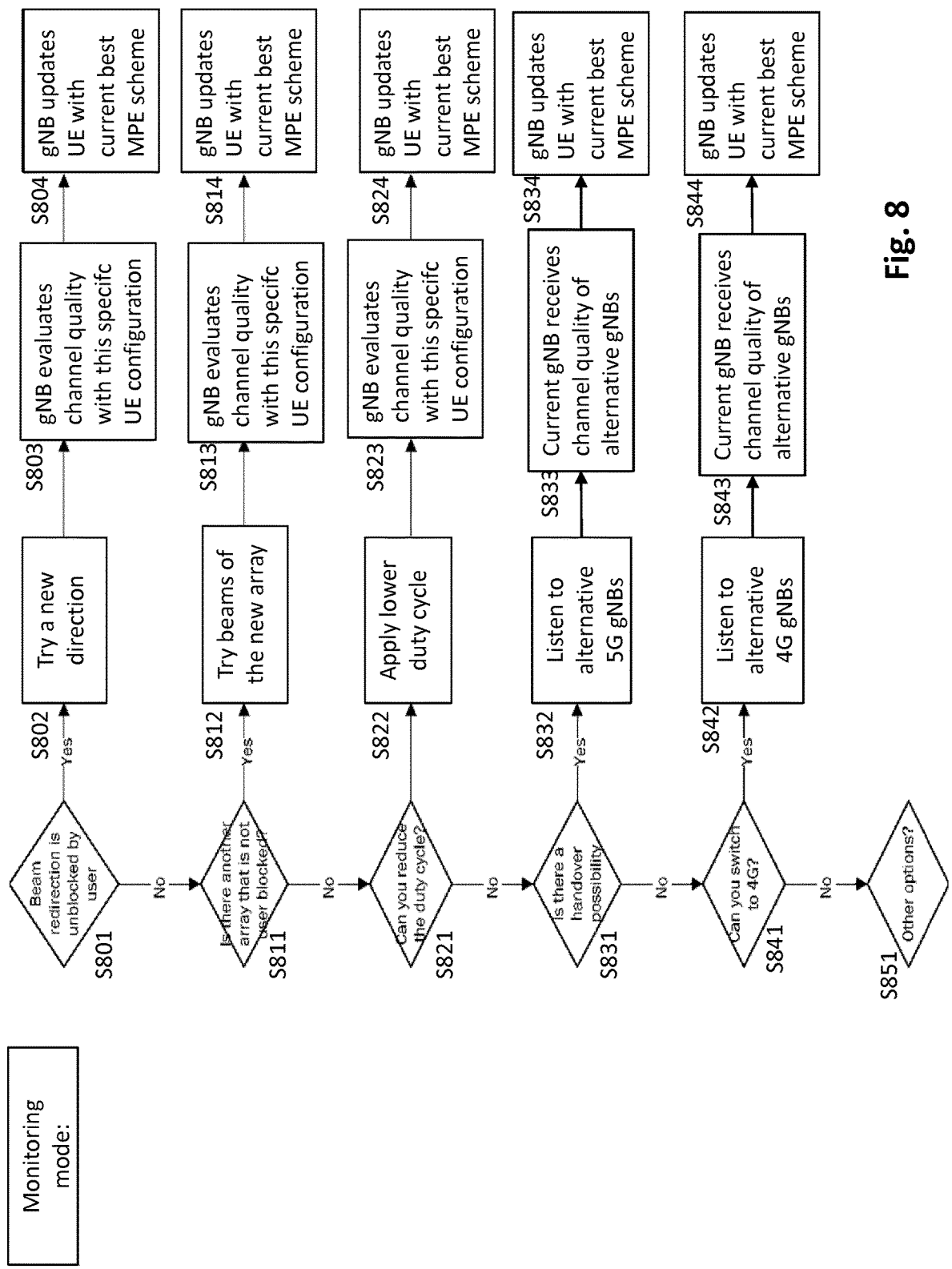
FIG. 8 shows a flowchart illustrating details of a monitoring mode according to an example implementation.

The communication between the UE and the gNB about the different options the UE has to comply with the FCC limit on MPE is summarized in the flow charts of FIGS. 7 and 8.

In FIG. 7, D is the distance between the user and the antennas, while $d_{min}$ and $d_{max}$ are the limits of the pre-warning region where the monitoring occurs (see FIG. 6).

In an established connection between UE and gNB, in case D falls below $d_{min}$ (Yes in step S701), the process of FIG. 7 advances to step S702 in which it is checked if there is a gNB decision on an operation to be performed by the UE to avoid a PBO. If there is no such decision (No in step S702), the process advances to step S707 in which the UE performs a PBO, and afterwards continues transmission in step S706. Otherwise, if there is a gNB decision (Yes in step S702), the process advances to step S703 in which an MPEC action is followed, and then transmission is continued in S706.

In case D does not fall below $d_{min}$ (No in step S701), the process of FIG. 7 advances to step S704 in which it is checked if D falls below $d_{max}$. If D falls below $d_{max}$ (Yes in S704), the process advances to step S705 in which the UE enters the monitoring mode. After that, transmission is continued in S706. If D does not fall below $d_{max}$ (No in S704), the process advances to step S706 in which transmission is continued.

The flowchart of FIG. 8 lists a few options as options monitored in the monitoring mode according to an example implementation. According to an example embodiment, the gNB selects options of operations to be monitored in the monitoring mode and generates a list of the selected options and forwards the list to the UE. According to another example embodiment, the UE selects options of operations to be monitored in the monitoring mode and generates a list of the selected options. According to still another example embodiment, the gNB and the UE select the options and generate the list together.

In step S801, it is checked whether beam redirection is unblocked by the user. If "Yes" in S801, the process proceeds to S802 in which a new direction of the beam is tried, in S803 this alternative UE beam configuration is sent by the UE to the gNB and the gNB evaluates channel quality with this specific UE configuration, and in S804 the best UE beam for the current channel conditions is chosen by the gNB and signaled back to the UE. In other words, the gNB updates the UE with the currently best MPE scheme.

Assuming same beam for UL and DL, with this option 5G NR UL performance might be kept. The beam could be redirected to the same gNB while avoiding the user. There might be a reflection, which would give less deterioration than a 26 dB drop in power. The UL could be directed to another gNB to both maintain 5G NR UL performance and avoid the user. This option depends on the steerability of the antenna array on the UE as well as on the area covered by the user and on its distance to the UE (FF or NF).

If "No" in S801, the process advances to step S811.

In step S811 it is checked if there is another antenna array that is not blocked by the user. If "Yes" in S811, the process proceeds to S812 in which beams of the new array are tried, in S813 the new UE beam configuration is sent by the UE to the gNB, and in S814 the best UE beam chosen by the gNB is sent to the UE from the gNB. If the UE is equipped with more than one 5G antenna array and if the other array is not covered by the user, this option could avoid directing the power towards the user.

If "No" in S811, the process advances to step S821.

In step S821 it is checked if the duty cycle can be reduced. If "Yes" in S821, the process proceeds to S822 in which a lower duty cycle is applied, in S823 the UE signals the duty cycle to the gNB, and in S824 the best UE configuration chosen by the gNB is sent to the UE. Reducing the duty cycle to cope with MPE from 100% to 50% allows to reduce output power.

If "No" in S821, the process advances to step S831.

In step S831 it is checked if there is a handover possibility. If "Yes" in S831, the process proceeds to S832 in which the environment is scanned. In step S833, the current gNB receives channel quality of alternative 5G gNBs. If the current gNB ranks this option as best one in step S834, the gNB updates the UE accordingly and another gNB takes over the communication with this UE, for both UL and DL. Because the UE had to reduce its output power, redirect the beam or switch array (also redirecting the beam) to avoid the user, the communication might just be better with another gNB.

If "No" in S831, the process advances to step S841.

In step S841 it is checked if the UL can be switched to 4G. If "Yes" in S841, the process proceeds to S842 in which capabilities are reported to the gNB. In step S843, the current gNB receives channel quality of alternative 4G gNBs. If the current gNB ranks this option as best one in step S844, the gNB updates the UE accordingly. 4G uses lower frequency bands, gains and modulation schemes and might not be violating the SAR requirements for the same distance from the user to the UE.

According to an example implementation, in steps S804, S814, S824, S834 and S844, the gNB updates the UE with the best option of the options of operations monitored in the monitoring mode, which is to be used to mitigate degradation of the established connection due to a required power backoff.

If "No" in S841, the process advances to step S851.

In step S851 it is checked if there are other options of operations to be performed by the UE to mitigate degradation of the established connection due to a required power backoff of an antenna of the UE.

For example, (e.g. if "Yes" in S851) the UE may remain using the same array but turn some of the antenna elements off. In this case, the gain of the antenna is reduced proportionally to the amount of antenna elements that are turned off. The antenna radiation pattern becomes much broader. This option is a way to perform a PBO.

Another option proposes to combine multiple gNBs, i.e. to use different gNBs for UL and for DL. This might be relevant in connection with previous options, both redirecting the beam and/or using another antenna array.

In the event of the gNB not being able to communicate to the gNB what to do to mitigate the channel degradation after reaching the MPE limit (e.g. if "No" in S851), the UE must perform a PBO.

In this case, the decision is taken by the gNB with the UE information. This option takes into consideration the UE capabilities as well as the channel. The monitoring zone gives time for the gNB to decide what the UE should do based on real conditions of the channel instantly.

According to an example embodiment, a user equipment is provided, the user equipment comprising:
  means for detecting a condition that a distance between the user equipment, which has an established connection with a network entity of a communications network system, and a subject enters a pre-warning region; and
  means for entering a monitoring mode based on at least the detected condition, wherein in the monitoring mode options of operations to be performed by the user equipment to mitigate degradation of the established connection due to a required power backoff of an antenna of the user equipment are monitored.

According to an example implementation, the user equipment further comprises means for notifying the network entity of the detected condition.

According to an example implementation, the user equipment further comprises means for requesting permission from the network entity to enter the monitoring mode.

According to an example implementation, the user equipment further comprises means for receiving permission to enter the monitoring mode from the network entity,
  wherein the user equipment enters the monitoring mode based on the detected condition and the permission from the network entity.

According to an example implementation, the monitoring mode comprises a monitoring cycle with which at least one of the options of operations are monitored.

According to an example implementation, the user equipment further comprises means for receiving information on the monitoring cycle from the network entity.

According to an example implementation, in the pre-warning region the user equipment is at risk of performing the power backoff.

According to an example implementation, the pre-warning region is defined by a first distance between the user equipment and the subject and a second distance between the user equipment and the subject, wherein the second distance is shorter than the first distance.

According to an example implementation, when the distance between the user equipment and the network entity falls below the second distance, the user equipment triggers the power backoff.

According to an example implementation, the user equipment further comprises means for receiving an indication of the first distance from the network entity.

According to an example implementation, the options of operations to be monitored in the monitoring mode comprise at least one of options selected by the user equipment and options selected by the network entity.

According to an example implementation, the user equipment further comprises means for receiving an update from the network entity with one of the options of operations monitored in the monitoring mode, which is to be used to mitigate degradation of the established connection due to a required power backoff.

According to an example embodiment, a network entity of a communications network system is provided, the network entity comprising:
    means for deciding on a parameter of a pre-warning region, wherein, when a distance between a user equipment and a subject enters the pre-warning region, the user equipment is capable of entering a monitoring mode in which options of operations to be performed by the user equipment to mitigate degradation of an established connection between the user equipment and the network entity due to a required power backoff of an antenna of the user equipment are monitored; and
    means for notifying the parameter to the user equipment.

According to an example implementation, the parameter comprises a first distance between the user equipment and the subject.

According to an example implementation, the pre-warning region is defined by the first distance and a second distance between the user equipment and the subject, wherein the second distance is shorter than the first distance.

According to an example implementation, in the pre-warning region the user equipment is at risk of performing the power backoff.

According to an example implementation, when the distance between the user equipment and the network entity falls below the second distance, the user equipment triggers the power backoff.

According to an example implementation, the deciding and notifying are performed during the established connection.

According to an example implementation, the network entity further comprises:
    means for deciding on a permission for the user equipment to enter the monitoring mode, upon receipt of a notification from the user equipment of a detected condition that a distance between the user equipment and the subject enters the pre-warning region; and
    means for informing the user equipment about a result of the decision.

According to an example implementation, the network entity further comprises:
    means for deciding on a permission for the user equipment to enter the monitoring mode, upon receipt of a corresponding request from the user equipment; and
    means for informing the user equipment about a result of the decision.

According to an example implementation, the network entity further comprises:
    means for deciding on a monitoring cycle for the monitoring mode, with which at least one of the options of operations are monitored; and
    means for informing the user equipment about the monitoring cycle.

According to an example implementation, at least one of the first distance, the permission and the monitoring cycle is decided based on a load of a cell of the network entity.

According to an example implementation, the options of operations to be monitored in the monitoring mode comprise at least one of options selected by the user equipment and options selected by the network entity.

According to an example implementation, the network entity further comprises:
    means for updating the user equipment with one of the options of operations monitored in the monitoring mode, which is to be used to mitigate degradation of the established connection due to a required power backoff.

It is to be understood that the above description is illustrative and is not to be construed as limiting. Various modifications and applications may occur to those skilled in the art without departing from the true spirit and scope as defined by the appended claims.

The invention claimed is:

1. An apparatus for use by a network entity of a communications network system, the apparatus comprising at least one processor and at least one memory including computer program code, the at least one memory and the computer program code configured to, with the at least one processor, cause the apparatus at least to:
    decide on a parameter of a pre-warning region, wherein, when a distance between a user equipment and a subject enters the pre-warning region, the user equipment is capable of entering a monitoring mode in which options of operations to be performed by the user equipment to mitigate degradation of an established connection between the user equipment and the network entity due to a required power backoff of an antenna of the user equipment are monitored; and
    notify the parameter to the user equipment,
    wherein at least one of the first distance, the permission and the monitoring cycle is decided based on a load of a cell of the network entity.

2. The apparatus of claim 1,
    wherein the parameter comprises a first distance between the user equipment and the subject,
    wherein the pre-warning region is defined by the first distance and a second distance between the user equipment and the subject, wherein the second distance is shorter than the first distance,
    wherein in the pre-warning region the user equipment is at risk of performing the power backoff, and
    wherein, when the distance between the user equipment and the network entity falls below the second distance, the user equipment triggers the power backoff.

3. The apparatus of claim 1, wherein the deciding and notifying are performed during the established connection.

4. The apparatus of claim 1, wherein the at least one memory and the computer program code are configured to, with the at least one processor, cause the apparatus to further:
 decide on a permission for the user equipment to enter the monitoring mode, upon receipt of a notification from the user equipment of a detected condition that a distance between the user equipment and the subject enters the pre-warning region; and
 inform the user equipment about a result of the decision.

5. The apparatus of claim 1, wherein the at least one memory and the computer program code are configured to, with the at least one processor, cause the apparatus to further:
 decide on a permission for the user equipment to enter the monitoring mode, upon receipt of a corresponding request from the user equipment; and
 inform the user equipment about a result of the decision.

6. The apparatus of claim 1, wherein the at least one memory and the computer program code are configured to, with the at least one processor, cause the apparatus to further:
 decide on a monitoring cycle for the monitoring mode, with which at least one of the options of operations are monitored; and
 inform the user equipment about the monitoring cycle.

7. The apparatus of claim 1, wherein the at least one memory and the computer program code are configured to, with the at least one processor, cause the apparatus to further:
 update the user equipment with one of the options of operations monitored in the monitoring mode, which is to be used to mitigate degradation of the established connection due to a required power backoff.

* * * * *